United States Patent Office 3,492,170
Patented Jan. 27, 1970

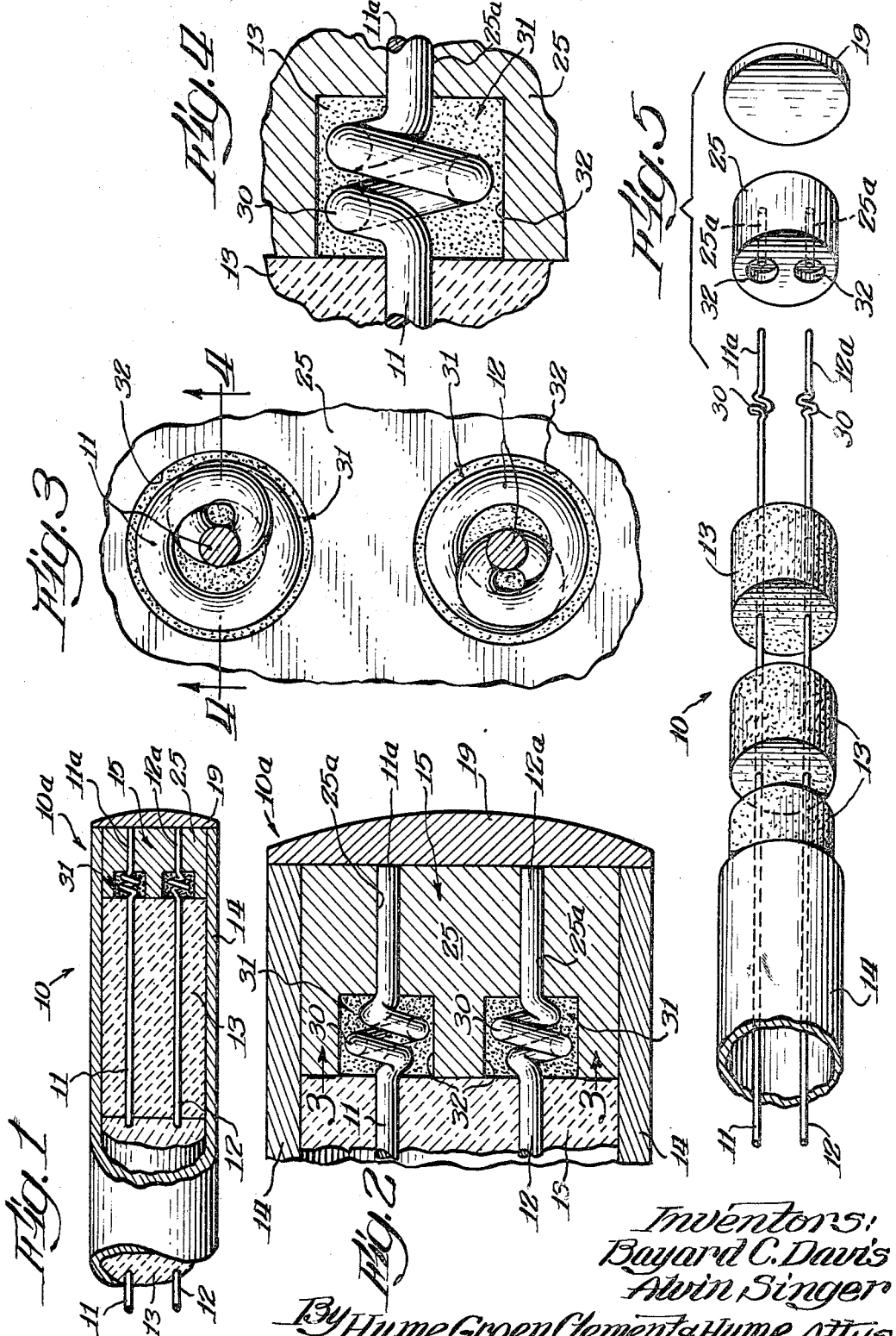

3,492,170
THERMOCOUPLE STRAIN RELIEF MEANS
Bayard C. Davis, 425 S. Grace, Lombard, Ill. 60148, and Alvin Singer, 1125 Hohlfelder, Glencoe, Ill. 60022
Filed Sept. 24, 1965, Ser. No. 489,941
Int. Cl. H01v 1/04
U.S. Cl. 136—233                2 Claims

ABSTRACT OF THE DISCLOSURE

A metallic sheathed and insulated thermocouple assembly having at least a pair of dissimilar thermocouple wires joined together at one end by a junction means that forms a stable mechanical and electrical junction between said wires, with strain relief means comprising an expansion coil for each of said wires formed by at least one axial turn of each of said wires adjacent said junction means to provide a reserve length of wire which permits substantial axial elongation of each of said wires without rupture and thereby relieves the assembly from strain resulting from thermal expansion thereof.

---

This invention relates generally to thermocouple assemblies, and more particularly relates to a thermocouple assembly provided with strain relief means.

It is an object of this invention to provide an improved form of thermocouple assembly.

It is a further object of this invention to provide an improved form of thermocouple assembly including means to relieve the axial strain on the thermocouple wires or elements employed therein which normally results from the thermal expansion or elongation thereof.

It is a still further object of this invention to provide a metallic sheathed and insulated thermocouple assembly with strain relief means which accommodates the thermal expansion of the thermocouple wires or elements employed therein and which allows substantial axial elongation of said thermocouple elements without causing rupture or failure thereof.

It is still another object of this invention to provide the thermoelements of a metallic sheathed and insulated thermocouple assembly having grounded or ungrounded, welded or non-welded, plug type junctions with strain relief means which provide a sufficient reserve length of element material adjacent the hot junction of the assembly to permit substantial elongation of the elements without rupture.

An additional object of this invention is to provide the thermoelements of a metallic sheathed and insulated thermocouple assembly with strain relief means which may be readily and inexpensively formed without creating any structural weakness in or detrimentally affecting the operation of the thermocouple assembly.

Additional objects and features of the present invention will become more apparent from the following description of one embodiment thereof, as illustrated in the accompanying drawing.

In this drawing:

FIGURE 1 is a fragmentary view in partial cross section illustrating a metallic sheathed and insulated thermocouple assembly having a non-welded and grounded hot junction provided with strain relief means for the thermocouple elements or wires in accordance with the present invention;

FIGURE 2 is an enlarged fragmentary cross-sectional view of the strain relief means as illustrated in FIGURE 1;

FIGURE 3 is a further enlarged fragmentary cross sectional view taken along the line 3—3 in FIGURE 2;

FIGURE 4 is a fragmentary cross sectional view taken along the line 4—4 in FIGURE 3; and FIGURE 5 is a partially exploded view of the thermocouple assembly illustrated in FIGURES 1 through 4.

Referring generally to the drawing, the present invention contemplates providing means to relieve the axial strain on the thermocouple wires of elements (thermoelements) of thermocouple assemblies of the type wherein the thermoelements are supported within a metallic sheath by an insulating medium. In such thermocouple assemblies, the insulating medium, which may be of the densely compacted type or which may be a suitable vitrified insulating material, intimately surrounds and confines the thermoelements in spaced-apart relationship within the outer metallic sheath of the assembly.

Certain limitations have attended the use of the type of thermocouple assemblies under consideration when the thermoelements thereof are made from a refractory metal or metal alloy, such as tungsten and rhenium, or from other metals having a relatively low tensile strength. For instance, welded refractory metal thermocouple junctions have been subject to failure due to discontinuities that arise in the welded junction when the refractory metal thermoelements are subjected to high temperature environments. Co-pending application Ser. No. 475,495, filed July 28, 1965, discloses and claims various embodiments of plug-type junctions which eliminate this disadvantage.

A further difficulty that can arise from the use of thermoelements made from a refractory metal or metal alloy, or other metals of low tensile strength, has been the inability of such thermoelements to accommodate thermal expansion and axial elongation without failure or rupture when only a portion of the thermocouple assembly is exposed to intense heat. Such failures or ruptures have heretofore been an inhibiting factor in the use of refractory metal thermoelements and the like in extremely high temperature environments.

In accordance with this invention, the operational versatility and structural reliability of assemblies including thermoelements made from a refractory metal or metal alloy, or other metals of low tensile strength are significantly enhanced by the provision of strain relief means for the individual thermoelements. The strain relief means furnishes sufficient reserve length of element material to allow axial thermal elongation of the thermoelements without attendant rupture or structural failure.

Although the strain relief means in accordance with this invention may be utilized with advantage in thermocouple assemblies of varying design, it has been found that this invention is particularly suitable for use with an assembly provided with the grounded or ungrounded, non-welded plug type junctions for the thermoelements as described and claimed in the aforementioned co-pending application. In this connection, the illustrated embodiment of the present invention represents the inclusion of strain relief means in an assembly incorporating a grounded, non-welded, plug-type junction.

Referring more specifically to the drawing, the illustrated thermocouple assembly 10 includes at least a pair of dissimilar thermoelements or wires 11 and 12 that may be formed of a refractory metal or metal alloy or other metal alloy of low tensile strength. The thermoelements 11 and 12 are maintained in parallel spaced-apart, electrically insulated relation and, more specifically, are surrounded by and confined within a filler 13 of suitable temperature-resistant insulating material. The filler 13 is in turn intimately surrounded by a metallic sheath 14 of a suitable material which is both impervious to moisture and resistant to the extremely high temperatures usually encountered during the use of such thermocouple assemblies. The filler 13 may either be a densely compacted ceramic insulating medium, or may comprise a plurality of adjacently disposed and non-compacted vitrified (i.e., high-fired) pellets.

In this illustrated embodiment, the thermocouple assembly is constructed so that the terminal end portion 10a constitutes the hot junction for the assembly. Thus, the ends 11a and 12a of the thermoelements 11 and 12 are jointed together in electrical contact adjacent the terminal end 10a of the assembly 10 so as to form the junction 15. This junction 15 is of the grounded, non-welded plug type as described and claimed in the aforementioned co-pending application and is formed by including in the assembly a single metallic plug member 25 which is pre-drilled to accommodate the free ends 11a and 12a of the parallelly disposed thermoelements or wires 11 and 12. More specifically, the plug member 25, which is formed of a metallic material generally compatible with the other components of the completed thermocouple assembly, is preferably pre-drilled with a pair of parallel apertures 25a that are proportioned to receive the terminal ends 11a and 12a of the thermocouple wires.

In accordance with this invention, these thermoelements 11 and 12 are provided with strain relief means which furnish a reserve length of wire so that the thermoelements may expand axially without rupturing when a portion of the assembly is subjected to an extremely high temperature environment. As clearly illustrated in the exploded views of FIGURES 2 and 4, the strain relief means for the wires 11 and 12 in accordance with this invention comprises a helical coil 30 formed from the individual thermoelements or wires 11 and 12 adjacent the junction 15 by coiling each wire about its axis at least one turn prior to final processing of the assembly. The helical coils 30 thus formed on the individual wires 11 and 12 are sufficiently flexible to permit axial expansion or elongation of the wires within the assembly, and provide a sufficient reserve length of thermoelement material so that thermoelements of relatively low tensile strength may yield in an axial direction without rupturing.

In the preferred embodiment of the invention, each helical coil 30 is substantially confined or housed within one of a plurality of chambers 31 formed in the plug 25. Each chamber 31 provides sufficient space which permits the coil to expand axially in response to thermal expansion of the thermocouple assembly while at the same time accommodating a quantity of insulating material. More specifically, the chamber 31 for each coil 30 is provided by an enlarged circular recess 32 drilled in the bottom surface of the plug 25 in coaxial alignment with the apertures 25a. As shown in FIGURE 4, the diameter of each of the recesses 32 is slightly larger than the diameter of the coils 30, and the insulating material 13 which is confined within the sheath 14 is also preferably distributed throughout and confined within the portion of the recesses which is not occupied by the coil 30.

In constructing this assembly as outlined in the aforementioned co-pending application and after the ends of the wires 11 and 12 have been placed within the apertures 25a and the coils 30 placed within the protective chambers 31 defined by the recesses 32, the plug 25 is preferably swaged about the ends of the wires to insure a strong and reliable mechanical and electrical bond between the plug 25 and the wires.

After the insertion of the wire ends 11a and 12a into the apertures 25a and the swaging of the plug 25, fabrication of the assembly is continued by stringing pellets or the like of ceramic material forming the filler 13 onto the thermocouple wires 11 and 12. During this stage of the assembly fabrication process, a quantity of insulating material, preferably in powdered or granular form, is introduced to the chambers 31 so that the regions thereof not occupied by the coils 30 are completely filled, and any void regions are eliminated.

The partially fabricated assembly, as described above, is then fitted within the exterior sheath 14, and the entire unit is subjected to a final swaging operation to yield a homogeneous assembly. Depending upon the type of material comprising the filler 13, the final swaging of the sheath 14 either densely compacts the insulating material, or brings the sheath into intimate confining relationship with the vitrified pellets.

The thermocouple assembly is then completed by securing a cap or closure element 19 to the terminal portion 10a of the completed assembly, such as by welding, subsequent to the final swaging operation. As outlined above, the completed assembly yields a thermocouple unit which is free of void spaces, particularly in the region of the junction 15 and which includes strain relief means that accommodates the axial elongation of the thermoelements.

It will be appreciated that the foregoing description is merely illustrative of this invention. Various modifications of the aforementioned embodiment of this thermocouple assembly may be devised by those skilled in the art without departing from the scope of this invention, as set forth in the accompanying claims.

What is claimed is:
1. A thermocouple assembly which comprises
   at least a pair of dissimilar thermocouple wires;
   a quantity of temperature resistant insulating material surrounding said wires so as to confine and maintain said wires in spaced apart relation;
   a metallic outer sheath intimately surrounding said insulating material so as to fixedly confine said wires therein and maintain said wires in insulated relationship with respect to said sheath;
   strain relief means for said thermocouple wires comprising an expansion coil formed by at least one axial turn of each of said wires adjacent the ends of said wires that are to form the thermocouple junction of said assembly, said strain relief means providing a reserve length of wire which permits substantial axial elongation of each of said wires without rupture;
   a junction member secured within said sheath for receiving said thermocouple wires and forming a stable mechanical and electrical junction between said wires, said junction member defining a chamber in alignment with each of said thermocouple wires wherein one each of said expansion coils is intimately and protectively housed; and
   a quantity of temperature resistant insulating material surrounding said expansion coils within said chambers whereby any void regions within said chambers are substantially eliminated.
2. A thermocouple assembly in accordance with claim 1 wherein said junction member comprises a metallic plug junction having chambers that are proportioned in accordance with the size of said expansion coils so that said coils are intimately confined within said chambers.

References Cited

UNITED STATES PATENTS
2,335,358  11/1943  Ray _____ 136—217 X
3,232,794  2/1966  Korton _____ 136—233

FOREIGN PATENTS
154,454  12/1920  Great Britain.

WINSTON A. DOUGLAS, Primary Examiner

M. J. ANDREWS, Assistant Examiner